United States Patent [19]

Hinden

[11] 4,429,209

[45] Jan. 31, 1984

[54] RESISTANCE WELDING PIN

[75] Inventor: Milton Hinden, Massapequa, N.Y.

[73] Assignee: Duro Dyne Corporation, Farmingdale, N.Y.

[21] Appl. No.: 312,527

[22] Filed: Oct. 19, 1981

[51] Int. Cl.³ .............................................. B23K 9/20
[52] U.S. Cl. ...................................... 219/98; 373/137
[58] Field of Search .................... 219/98, 99; 411/455; 52/334, 410; 373/130, 137

[56] References Cited

U.S. PATENT DOCUMENTS

| | | | |
|---|---|---|---|
| 2,172,553 | 9/1939 | Tripp | 411/455 |
| 2,638,525 | 5/1953 | Candy | 219/99 |
| 3,624,340 | 11/1971 | Hinden | 219/99 |
| 4,031,350 | 6/1977 | Hinden et al. | 219/99 |

Primary Examiner—Roy N. Envall, Jr.
Assistant Examiner—Alfred S. Keve
Attorney, Agent, or Firm—Mark T. Basseches; Paula T. Basseches

[57] ABSTRACT

The present invention is directed to an improved resistance welding pin especially adapted for fastening of batts of insulating material to metallic air conduits, such as the ducts of air conditioning and heating systems. The pin is characterized by a novel corrugated shank portion extending between the head of the pin and the sharpened tip which functions, inter alia, to dissipate the heat generated in the shank during welding, with a plurality of attendant advantages.

2 Claims, 4 Drawing Figures

RESISTANCE WELDING PIN

BACKGROUND OF THE INVENTION

1. FIELD OF THE INVENTION

The present invention is in the field of resistance welding pins and method of applying the same and relates more particularly to an improved resistance welding pin used for the attachment of batts or sheets of insulating material to the interior surfaces of air ducts, namely the ducts of air conditioning and heating installations.

2. THE PRIOR ART

It is known to improve the energy efficiency of air conditioning and heating installations employing metallic duct work to apply to the ducts, and normally to the interior portions thereof, batts or sheets of insulation generally one to two inches thick. An adhesive may be used to connect the insulation to the duct. In addition, to assure permanence of attachment, a metallic member having a head portion bearing against the exposed surface of the insulation has a free end portion welded or otherwise attached to the metal duct.

In one form of attachment mode, the attachment member may comprise a pin having an enlarged head and a sharpened tip, the tip being adapted to be connected to the metallic duct by a resistance welding method wherein the duct is connected to a ground electrode and the head of the pin to a live electrode. A current is passed through the length of the pin while the pin is urged toward the duct, resulting in the melting of the tip-adjacent portions of the pin and the tip engaging portions of the duct, whereby the tip of the pin is fused to the duct. The described operation is often carried out through the use of automatic machinery which applies simultaneously a plurality of pins at laterally spaced positions.

A suitable welding pin is disclosed in my U.S. Pat. No. 3,624,340 of Nov. 30, 1971. Apparatus for automatically welding such pin is shown in my U.S. Pat. No. 3,835,285 of Sept. 10, 1974. A machine for the simultaneous attachment of a plurality of pins is shown in U.S. Pat. No. 3,858,024 of Dec. 31, 1974 to Milton Hinden and Charles Giannone. All of the above noted patents are owned by the assignee hereof.

While the pins and attachment apparatuses of the above referenced patents have achieved substantial commercial success, it has been determined that the economy and performance thereof can be improved through the use of a welding pin as hereinafter described and claimed.

More specifically, the welding pins employed heretofore have included an elongate shank having a smooth cylindrical exterior, headed at one end and sharpened at the other. The headed end of the pin has typically been enlarged either integrally or with a separate apertured disk at the under-junction of the head and shank to afford a large contact area with the surface of the relatively fragile insulating material which is usually fabricated of glass fibers. The tip end of the pin is sharpened so as to facilitate penetration through the fibers and provide secure electrical contact with the metal duct.

Since a given installation will include many hundreds or thousands of welding pins, the cost of the pins is a factor to be considered.

The pins heretofore used have employed relatively thick shank portions, in the area of 0.15". As noted in U.S. Pat. No. 3,624,340, the tip angle is pertinent to the effectiveness of the welding procedure. If the tip angle is too acute, the weld may not result in the thickest portion of the shank abutting the surface of the metal duct, with the resultant loss of stability of the attached pin as against side forces exerted thereagainst. If the angle is too obtuse, the tip may not adequately penetrate the fiber mass, and even if such penetration is achieved, due to the relatively low resistance of the tip portion resulting from its thick cross section, rapid melt may not be achieved.

Importantly, as noted hereinabove, it has been found necessary in order to provide both the necessary tip angle and current carrying capacity to form the welding pins with relatively thick shanks even though the strength of the shank, after attachment, is not a factor in the final installation.

Attempts to effect economies through the use of significantly smaller diameter pins, with obvious attendant savings in metal costs, have proved unsatisfactory since such thinner shanks tend to overheat in the course of welding. Where such shanks overheat, the pin body tends to bow or skew due to softening of the metal, whereby the requisite pressures of tip against duct throughout the short cycle of the welding apparatus are not developed.

SUMMARY OF THE INVENTION

It has unexpectedly been discovered that an improved resistance welding pin for use in the environment aforesaid may be achieved by providing the shank portion thereof with a generally cylindrical core portion surrounded by a series of axially spaced areas, segments or sectors of increased radial extent. The radial projection, which may be in the form of annulae or may comprise a continuous helix, has an outer diameter preferably at least about one third greater than the outer diameter of the core portion, and desirably from about one third to about three fifths greater. The axial spacing of the outermost extremity of said projecting portions is preferably in the range of from about three quarters to about one and one quarter times the diameter of the core.

It has been discovered that a pin of the type described may be fabricated with a substantially smaller average cross section in the shank thereof than a solid, cylindrical pin without exhibiting an undesirable tendency to bend or skew during attachment. Such pin may be effectively attached with the expenditure of lower welding energy, provides equal or superior adhesion to the duct and exhibits a lesser tedency to burn or damage the shank-adjacent portions of the insulation.

Without limitation to any specific theory, it is believed that the advantageous results noted arise from the fact that the corrugations or fins defined by the radial enlargement operate to dissipate the heat of weld and the heat arising from the flow of current through the shank whereby, despite the fact that there is less total metal in the shank, the same retains its mechanical integrity during heating to a greater degree than a cylindrical shanked pin having comparable metal content in the shank.

An additional and unexpected benefit of the use of a pin of the type described resides in the tendency of the shank frictionally to engage the material of the insulating body to a far greater extent than a cylindrical shank pin. The advantage of such adhesion is particularly apparent when the pins are applied by a multi-head welding apparatus of the type disclosed in U.S. Pat. No. 3,858,024, above referenced. This is so since inevitably during a fractional percentage of welding cycles a pin or pins may, for one reason or another, not be securely welded to the duct. In such case, when the multiple head welding device is lifted from the weld position, a smooth shank pin will tend to remain on the head of the welding device. When the welding device is thereafter advanced through an operating cycle, the still attached pin will jam the automatic feed mechanism, whereby a further welding pin will not be fed to the head having the retained pin. Such condition mandates shutdown and clearing of the jammed head, with attendant down time.

The welding pin in accordance with the invention, by virtue of its frictional connection with the batting material, will, even in the absence of formation of a weld, tend to remain in the batting material when the machine advances to a subsequent step, whereby jamming is avoided.

Additionally, where a proper weld is effected, a pin in accordance with the invention will provide a degree of retention of the insulation due to the corrugations in the shank even if the head of the pin is not brought into intimate contact with the surface of the batting material.

As noted, the improved connection is believed, at least in part, to be effected by the heat dissipating characteristics of the shank of the pin of the instant invention, which cooling effect has the additional benefit of maintaining a low electrical resistance in the portions of the pin furthest from the weld and, hence, concentrating the areas of high resistance and consequent voltage drop at or near the tip of the pin.

It is accordingly an object of the present invention to provide an improved pin for effecting a resistance weld to support an insulating batt to the surface of a duct.

A further object of the invention is the provision of an improved welding pin which includes a sharpened tip, a head and a shank connecting the tip and the head, the shank being characterized by the presence of a plurality of axially spacedapart fins or corrugations.

Still a further object of the invention is the provision of a resistance welding pin of the type described wherein the shank comprises a solid core portion surrounded by integral, axially spaced, radially extending fin portions, the outer diameters of which are at least about one third greater, and preferably from about one third to about three fifths greater in diameter than the diameter of the core and the axial spacing of such corrugations is in the range from about three quarters to about one and one quarter times the diameter of the core.

Still a further object of the invention is the provision of a method of attaching insulating batt to the surface of a duct by resistance welding wherein the shank of the resistance welding pin incorporates fins or corrugations as hereinabove described.

To attain these objects and such further objects as may appear herein or be hereinafter described, reference is made to the accompanying drawings forming a part hereof, in which.

Figure 1:
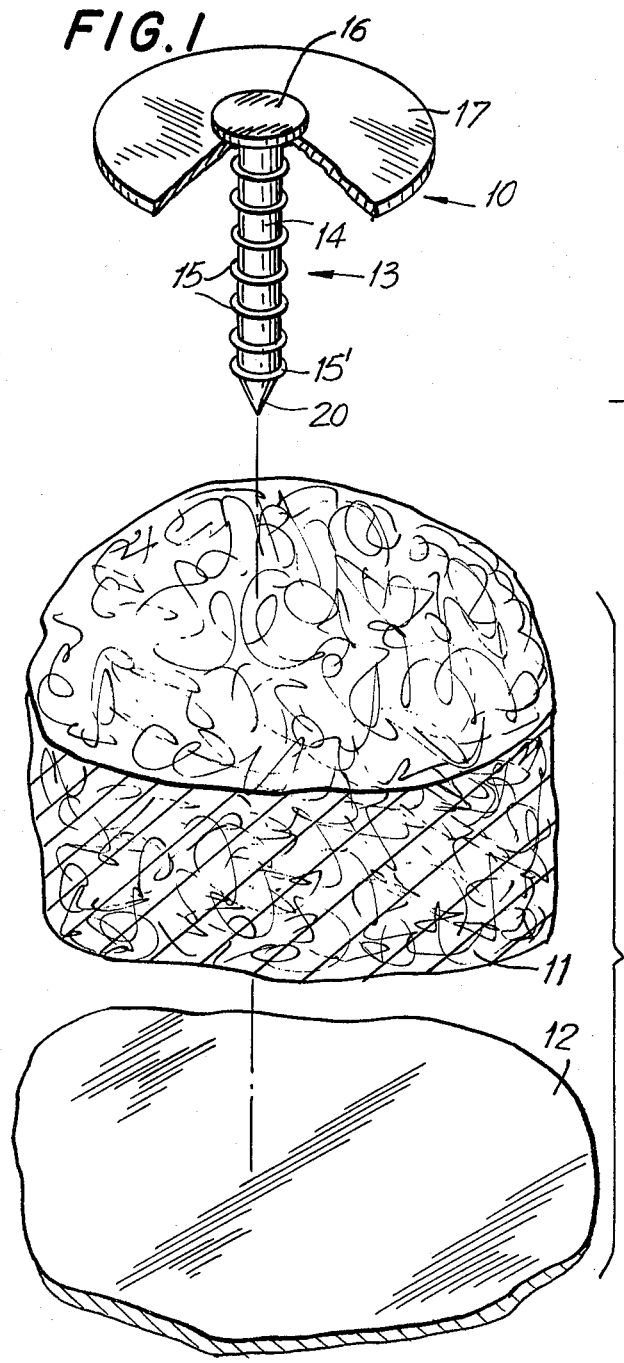
FIG. 1 is an exploded perspective view showing a welding pin in accordance with the invention juxtaposed to an increment of insulating batt and duct component.
Figure 2:
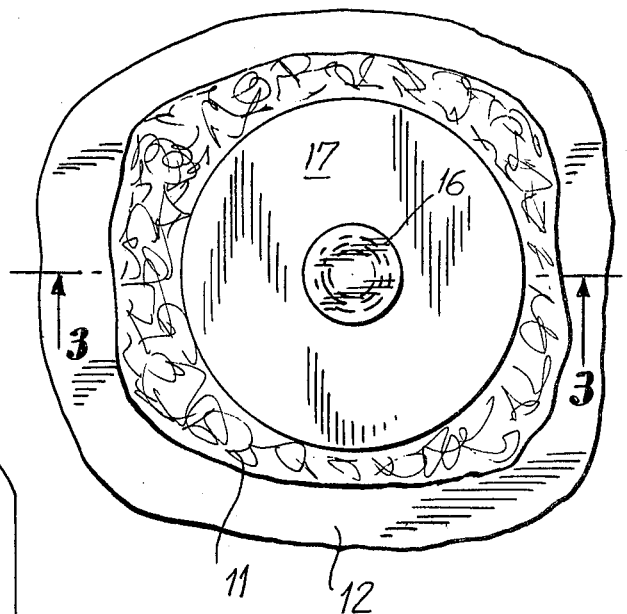
FIG. 2 is a plan view of a pin in accordance with the invention attached to a duct.
Figure 3:
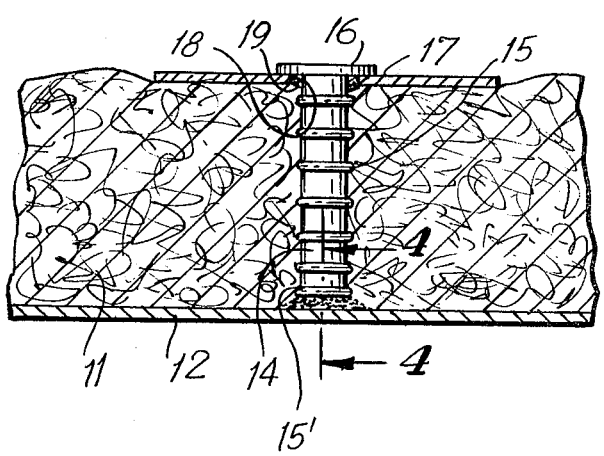
FIG. 3 is a section taken on the line 3—3 of FIG. 2.

Turning now to the drawings, there is disclosed in FIG. 1 a resistance welding pin 10 in accordance with the invention shown in juxtaposition to a section or thickness of insulating material 11 and a metal duct substrate 12. The pin includes a shank portion 13 having a central core portion 14 generally cylindrical in section, a series of fins or flutes 15 extending radially beyond the core and being axially spaced along the length of the shank.

The pin includes an enlarged head portion 16 on its upper end. An enlarged washer 17 is mounted immediately beneath the head 16, the washer being aperture as at 18. The washer may be retained in position adjacent the head 16 by inwardly deforming depending collar 19 after the washer has been sleeved over the shank.

The pin includes a sharpened point 20 at its lower end. Preferably the lowermost fin 15' is disposed at an axial position coinciding with the junction of the point 20 and core portion 14 of the shank.

Figure 4:
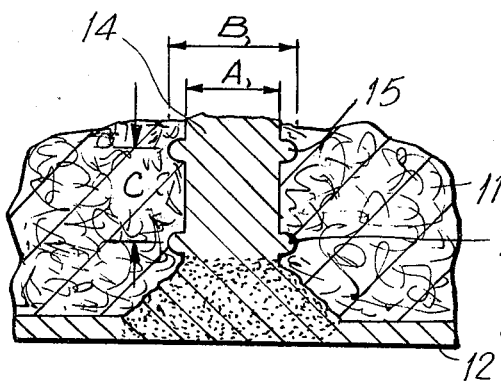
FIG. 4 is a magnified section taken on the line 4—4 of FIG. 3.

Referring to FIG. 4, the fins or flutes 15 have an outer diameter B which is at least about one third greater than the outer diameter A of the core, and preferably from about one third to about three fifths greater. The spacing axially along the length of the shank of the fins 15 from the widest point to widest point (distance C, FIG. 4) is in the preferred range of from about three quarters to about one and one quarter times the diameter A of the core.

The manner of attachment of the pin is essentially as set forth in U.S. Pat. No. 3,624,340 and the other patents hereinabove cited. More particularly, when it is desired to secure a pin to substrate 12, a welding electrode (not shown) is pressed downwardly against the upper surface of head 16, forcing the tip 20 of the pin through insulation batt 11 and into contact with the uppermost surface of the substrate 12. With the components thus juxtaposed and with the substrate 12 connected to a ground electrode, a welding current is passed through the head, shank and tip of the pin for a predetermined short period of time while pressure is continuously applied against the head of the pin. The pin tip and portions of the substrate adjacent the tip are caused by the current to melt and interfuse, effecting a dependable connection between the pin and the substrate.

Desirably the melting is restricted to the tip of the pin and such effect is normally achieved since the electrical resistance of the tip components increase progressively toward the point due to the decreasing cross sectional area. The voltage drop and, hence, the heating effects, will be greater in the area of highest electrical resistance.

By providing an enlarged fin member 15' essentially at the junction of the tip and core portion of the pin, with a consequent rapid decrease in electrical resistance when the fin 15' comes into contact with the substrate, a tendency toward interruption of the welding action results when the fin 15' reaches the substrate. This action, in addition to preventing weld-through or puncturing of the substrate, provides the advantage of assuring that a shoulder-like configuration will lie adjacent the substrate in the welded condition of the pin, whereby the attached pin is rendered more resistant to dislodgement responsive to tilting forces exerted against the pin.

The presence of a plurality of fins or flutes materially increases dissipation of the heat along the shank. This action maintains the voltage drop along relatively cooler shank at a minimum, maximizing the voltage drop across the heated high resistance area of the tip, minimizing burning of insulation surrounding the shank at areas remote from the weld.

It will be noted that even if the welding action is terminated prematurely, i.e. before the disk member 17 is pressed against the surface of the insulating member, a degree of holding of the insulation is achieved due to the corrugated nature of the shank.

The high heat dissipation shank enables a lesser amount of metal to be employed in the shank without loss of attachment power, thereby effecting economies since the cooler shank will not bend or soften due to over heating.

Due to the tendency of the corrugated shank to be frictionally retained within the insulating material, if a weld should fail to be effected the pin will nonetheless remain embedded in the insulation material, unlike a cylindrical shank pin which would be withdrawn by the magnetic forces which secure the pin to the welding electrode. Thus, jamming of automatic feed mechanisms for guiding the pins to welding heads is eliminated.

While the invention has been described and illustrated in conjunction with a series of annular fin members, it is to be understood that the specific annular configuration is not critical to the satisfactory performance of the device. Rather, it is possible that the fins comprise components of a continuous helix since the heat radiation function is equally well performed by such construction.

As will be apparent to those skilled in the art and familiarized with the instant disclosure, numerous variations may be made in the specific details of the illustrated embodiment without departing from the invention and, accordingly, the same is to be broadly construed within the scope of the appended claims.

Having thus described the invention and illustrated its use, what is claimed as new and is desired to be secured by Letters Patent is:

1. A metallic welding pin for the attachment of insulative batts to a metallic substrate by resistance welding comprising, in combination, an axially directed shank portion having a sharpened tip at one end and an integral head at the other end, a washer member of greater external diameter than said head mounted over said shank and disposed at the junction of said head and shank, said pin being characterized in that said shank portion, along substantially the entire length thereof from said head to the junction of said shank and tip, includes a solid core portion surrounded by integral, axially spaced, radially outwardly extending fin portions, the outer diameter of said fin portions being from one third to three fifths greater than the outer diameter of said core, and the fin portion furthest from said head is located substantially at the junction of said shank and tip.

2. A pin in accordance with claim 1 wherein the axial spacing of adjacent said fins, measured along any given line parallel to the axis of said shank and tangent to the outermost extremities of said fins, is in the range from about three quarters to one and one quarter times the diameter of said core.

* * * * *